United States Patent
Jang et al.

(10) Patent No.: US 9,462,622 B2
(45) Date of Patent: Oct. 4, 2016

(54) METHOD FOR REQUESTING DEVICE-TO-DEVICE COMMUNICATION IN WIRELESS ACCESS SYSTEM AND APPARATUS FOR SAME

(71) Applicant: LG ELECTRONICS INC., Seoul (KR)

(72) Inventors: Jiwoong Jang, Anyang-si (KR); Hangyu Cho, Anyang-si (KR); Jinsoo Choi, Anyang-si (KR); Dongcheol Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 61 days.

(21) Appl. No.: 14/358,414

(22) PCT Filed: Nov. 19, 2012

(86) PCT No.: PCT/KR2012/009782
§ 371 (c)(1),
(2) Date: May 15, 2014

(87) PCT Pub. No.: WO2013/073915
PCT Pub. Date: May 23, 2013

(65) Prior Publication Data
US 2014/0314039 A1 Oct. 23, 2014

Related U.S. Application Data

(60) Provisional application No. 61/561,272, filed on Nov. 18, 2011, provisional application No. 61/562,441, filed on Nov. 22, 2011.

(51) Int. Cl.
H04W 76/02 (2009.01)
H04L 5/00 (2006.01)
(Continued)

(52) U.S. Cl.
CPC ............ *H04W 76/023* (2013.01); *H04L 5/003* (2013.01); *H04W 72/0406* (2013.01); *H04L 5/0091* (2013.01); *H04W 92/18* (2013.01)

(58) Field of Classification Search
CPC .......... H04W 76/023; H04W 72/0406; H04L 5/003
See application file for complete search history.

(56) References Cited

U.S. PATENT DOCUMENTS 7,554,961 B2 6/2009 Nago
2005/0239451 A1* 10/2005 Periyalwar .......... H04W 52/383
455/425

(Continued)

FOREIGN PATENT DOCUMENTS

JP 2009-124758 A 6/2009
KR 10-2008-0113837 A 12/2008
(Continued)

*Primary Examiner* — Khaled Kassim
*Assistant Examiner* — Syed S Ali
(74) *Attorney, Agent, or Firm* — Dentons US LLP

(57) ABSTRACT

Disclosed are a method for requesting device-to-device communication in a wireless access system that supports device-to-device communication and an apparatus for the method. More particularly, the method comprises the steps of: receiving, from a first device, request information for requesting device-to-device communication with a second device; transmitting, to the second device, check information to inquire whether to accept device-to-device communication with the first device; receiving, from the second device, response information indicating that device-to-device communication is accepted; and, if the second device has accepted the device-to-device, transmitting resource allocation information for device-to-device communication to the first device and the second device.

9 Claims, 9 Drawing Sheets

(51) Int. Cl.
*H04W 72/04* (2009.01)
*H04W 92/18* (2009.01)

(56) References Cited

U.S. PATENT DOCUMENTS

| | | | | |
|---|---|---|---|---|
| 2008/0130588 | A1* | 6/2008 | Jeong | H04W 74/002 370/335 |
| 2008/0273610 | A1* | 11/2008 | Malladi | H04L 1/0029 375/260 |
| 2009/0186613 | A1* | 7/2009 | Ahn | H04L 5/003 455/434 |
| 2010/0195585 | A1* | 8/2010 | Horn | H04W 74/08 370/329 |
| 2010/0254308 | A1* | 10/2010 | Laroia | H04W 8/005 370/328 |
| 2011/0134861 | A1* | 6/2011 | Seo | H04W 72/1289 370/329 |
| 2011/0258313 | A1* | 10/2011 | Mallik | H04W 8/005 709/224 |
| 2011/0275382 | A1* | 11/2011 | Hakola | H04W 24/10 455/452.2 |
| 2011/0280169 | A1* | 11/2011 | Seo | H04W 52/146 370/311 |
| 2012/0134305 | A1* | 5/2012 | Damnjanovic | H04L 1/1607 370/280 |
| 2013/0005377 | A1* | 1/2013 | Wang | H04W 72/0406 455/509 |
| 2013/0070692 | A1* | 3/2013 | Miki | H04W 72/048 370/329 |
| 2014/0369322 | A1* | 12/2014 | Fwu | H04W 52/18 370/336 |

FOREIGN PATENT DOCUMENTS

| | | |
|---|---|---|
| WO | 2010-047545 A2 | 4/2010 |
| WO | 2010-145799 A1 | 12/2010 |
| WO | 2011-082675 A1 | 7/2011 |

* cited by examiner (a)

(b)

(a)

(b)

METHOD FOR REQUESTING DEVICE-TO-DEVICE COMMUNICATION IN WIRELESS ACCESS SYSTEM AND APPARATUS FOR SAME

This application is a National Stage entry of International Application No. PCT/KR2012/009782 filed Nov. 19, 2012, which claims priority to U.S. Provisional Application Nos. 61/561,272 filed Nov. 18, 2011 and 61/562,441 filed Nov. 22, 2011, all of which are incorporated herein by reference.

TECHNICAL FIELD

The present invention relates to a wireless access system, and more particularly, to a method of requesting a device-to-device communication in a wireless access system supportive of the device-to-device communication and apparatus therefor.

BACKGROUND ART

In a cellular communication, a user equipment existing in a cell accesses a base station to perform communication, receives control information for exchanging data from a base station, and then transceives data with the base station. In particular, since the user equipment transceives data through the base station, in order to transmit data to another cellular user equipment, the user equipment transmits its data to the base station. Having received the data, the base station transmits the received data to another user equipment. Thus, since data can be transmitted through the base station in order for one user equipment to transmit data to another user equipment, the base station performs scheduling of channels and resources for the data transceiving and also transmits channel and resource scheduling information to each user equipment. Thus, in order to perform UE-to-UE communication through the base station, each user equipment needs channel and resource allocations to transceive data with the base station. Yet, according to the structure of D2D communication, one user equipment directly transceives signals with another user equipment, to which data shall be transmitted, without using a base station or a relay node.

If a device-to-device (hereinafter abbreviated D2D) communication for transceiving data in direct between user equipments is performed in a manner of sharing resources with the existing cellular network mentioned in the above description, a user equipment desiring the D2D (device-to-device) communication discovers a target user equipment and then confirms whether a counterpart user equipment accepts the D2D (device-to-device) communication through a request. However, a procedure for a user equipment desiring a D2D (device-to-device) communication to make a request for the D2D (device-to-device) communication to a counterpart user equipment, a channel for the same, information necessary to be transmitted for the same, a transmitting method for the sane and the like have not been defined yet.

DISCLOSURE OF THE INVENTION

Technical Tasks

One object of the present invention is to provide a method of smoothly transceiving data between user equipments in a D2D communication supportive wireless access system and apparatus therefor.

Another object of the present invention is to provide a method for a device desiring a D2D communication to check whether a D2D communication is accepted by a counterpart device and apparatus therefor.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

In an aspect of the present invention, disclosed herein is a method of requesting a D2D (device-to-device) communication in a wireless access system supportive of the D2D communication, the method comprising receiving request information for requesting the D2D communication with a second device from a first device, transmitting confirm information for querying whether to accept the D2D communication with the first device to the second device, receiving response information indicating whether to accept the D2D communication from the second device, and if the second device accepts the D2D communication, transmitting resource allocation information for the D2D communication to each of the first device and the second device.

In another aspect of the present invention, disclosed herein is a base station configured to request a D2D (device-to-device) communication in a wireless access system supportive of the D2D communication, the base station comprising an RF (radio frequency) unit configured to transceive radio signals and a processor configured to receive request information for requesting the D2D communication with a second device from a first device, transmit confirm information for querying whether to accept the D2D communication with the first device to the second device, receive response information indicating whether to accept the D2D communication from the second device, and, if the second device accepts the D2D communication, transmit resource allocation information for the D2D communication to each of the first device and the second device.

Preferably, the request information includes at least one of identification information of the first device, identification information of the second device, or identification information of at least one neighbor device estimated as causing an interference over a predetermined level among neighbor devices adjacent to the first device.

Preferably, the request information is transmitted through a message 3 of a contention-based random access procedure.

Preferably, the resource allocation information is transmitted through a message 4 in a contention-based random access procedure.

Preferably, the request information is transmitted along with a scheduling request.

Preferably, a transmission of the response information is performed through a contention free random access procedure.

In an aspect of the present invention, disclosed herein is a method of requesting a D2D (device-to-device) communication in a wireless access system supportive of the D2D communication, the method comprising transmitting request information for requesting the D2D communication with a second device to a base station from a first device, if the second device accepts the D2D communication, receiving resource allocation information for the D2D communication with the second device from the base station, and performing the D2D communication with the second device through the allocated resource.

In another aspect of the present invention, disclosed herein is a device configured to request a D2D (device-to-device) communication in a wireless access system supportive of the D2D communication, the device comprising an RF (radio frequency) unit configured to transceive radio signals and a processor configured to transmit request information for requesting the D2D communication with a second device to a base station, if the second device accepts the D2D communication, receive resource allocation information for the D2D communication with the second device from the base station, and perform the D2D communication with the second device through the allocated resource.

Preferably, the request information includes at least one of identification information of the first device, identification information of the second device, and identification information of at least one neighbor device estimated as causing an interference over a predetermined level among neighbor devices adjacent to the first device.

Preferably, the request information is transmitted through a message 3 of a contention-based random access procedure.

Preferably, the resource allocation information is transmitted through a message 4 of a contention-based random access procedure.

Preferably, the request information is transmitted along with a scheduling request.

Preferably, a transmission of response information indicating whether to accept the D2D communication of the second device is performed through a contention free random access procedure between the second device and the base station.

Advantageous Effects

According to an embodiment of the present invention, data can be smoothly transceived between devices in a wireless access system, and more particularly, in a D2D communication supportive wireless access system.

According to an embodiment of the present invention, a procedure for a device desiring a D2D communication to check whether a D2D communication is accepted by a counterpart desiring, a channel used for the same, necessary information for the same and the like are defined, whereby the device desiring D2D communication can check whether the D2D communication is accepted by the counterpart device.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Figure 1:
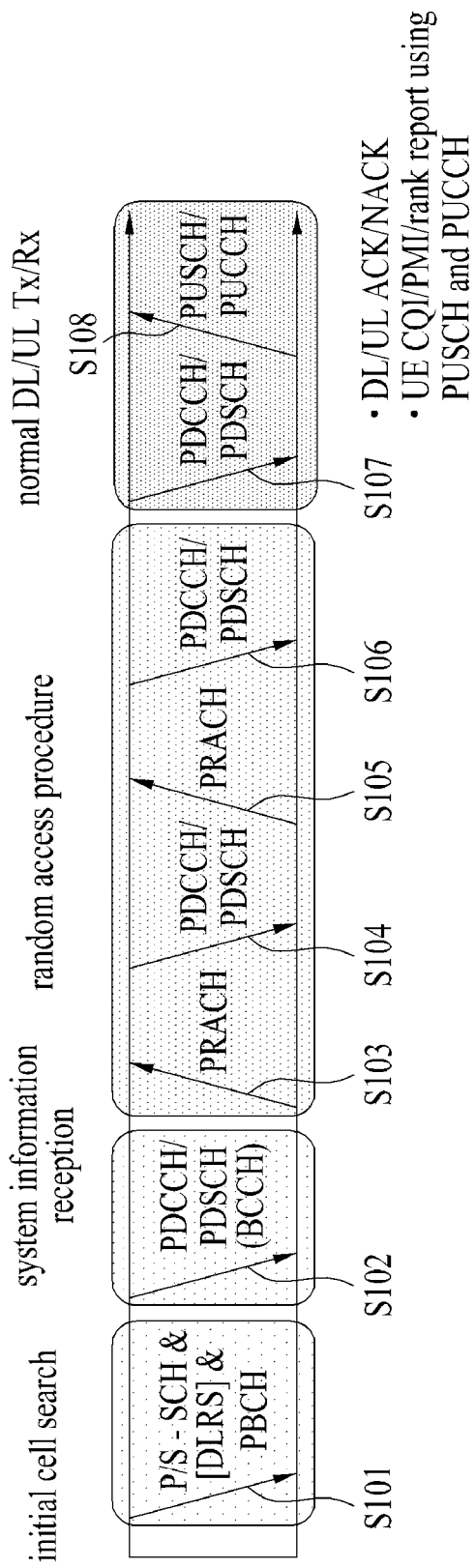
FIG. 1 is a diagram for explaining physical channels used for 3GPP system and a signal transmission using the same.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

In this specification, embodiments of the present invention are described centering on the data transceiving relation between a base station and a terminal. In this case, the base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. Moreover, in this document, 'base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'device' may be substituted with such a terminology as a user equipment (UE), a mobile station (MS), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE system, and 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns 3GPP LTE system or 3GPP LTE-A system, by which the technical idea of the present invention may be non-limited.

1. 3GPP LTE/LTE-a System to which the Present Invention is Applicable

FIG. 1 is a diagram for explaining physical channels used for 3GPP system and a signal transmission using the same.

First of all, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the base station, may match synchronization with the base station and may then obtain information such as a cell ID and the like.

Subsequently, the user equipment may receive a physical broadcast channel from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Subsequently, the user equipment may be able to perform a random access procedure to complete the access to the base station [S103 to S106]. To this end, the user equipment may transmit a specific sequence as a preamble via a physical random access channel (PRACH) [S103] and may be then able to receive a response message via PDCCH and a corresponding PDSCH in response to the random access [S104]. In case of a contention based random access, it may be able to perform a contention resolution procedure such as a transmission S105 of an additional physical random access channel and a channel reception S106 of a physical downlink control channel and a corresponding physical downlink shared channel.

Having performed the above mentioned procedures, the user equipment may be able to perform a PDCCH/PDSCH reception S107 and a PUSCH/PUCCH (physical uplink shared channel/physical uplink control channel) transmission S108 as a general uplink/downlink signal transmission procedure.

Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
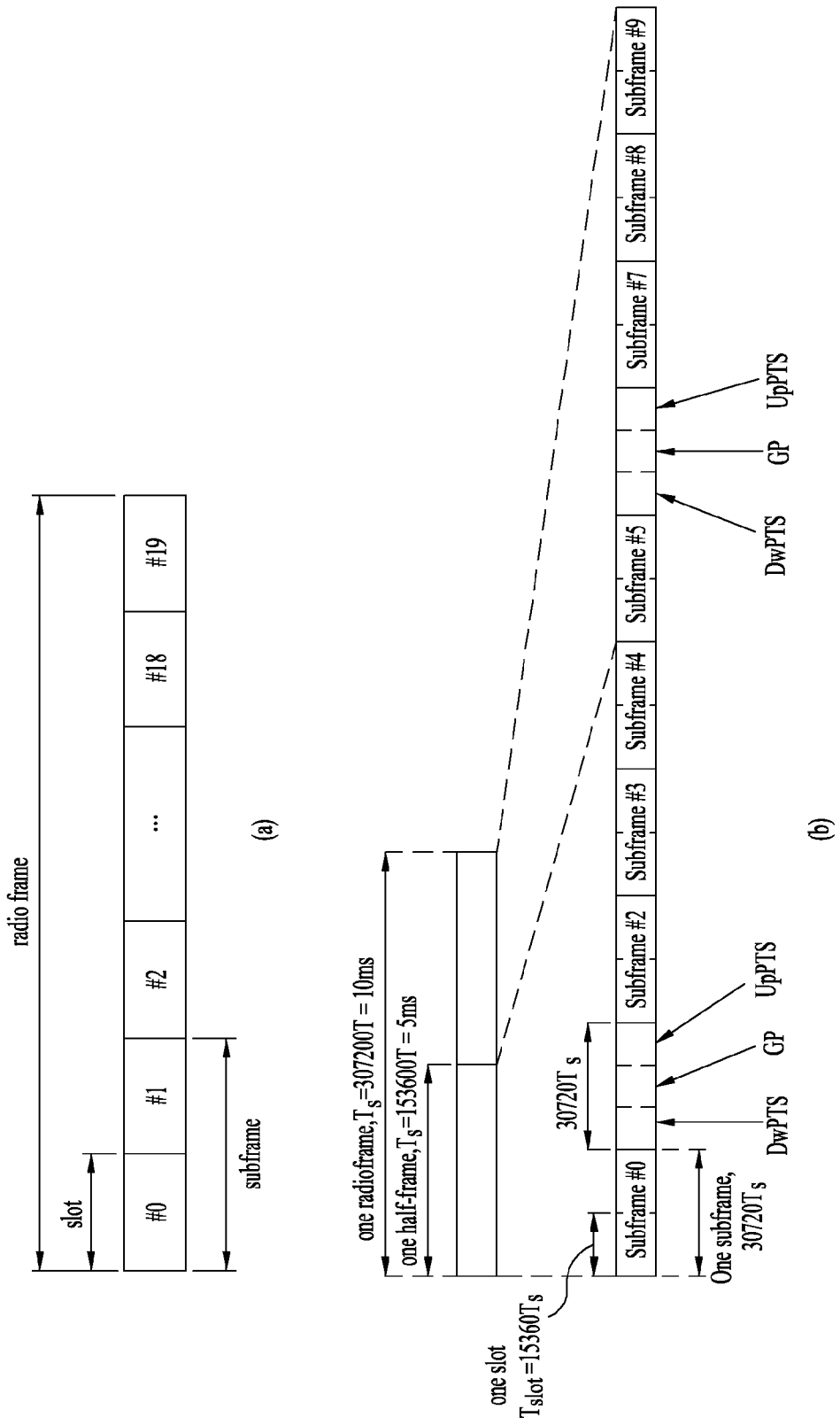
FIG. 2 is a diagram for a structure of a radio frame in 3GPP LTE.

FIG. 2 shows structures of radio frames in 3GPP LTE.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2 (a) shows one example of a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP system uses OFDMA in downlink, OFDM symbol is provided to indicate one symbol period. The OFDM symbol may be named SC-FDMA symbol or symbol period. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 2 (b) shows a structure of a downlink radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
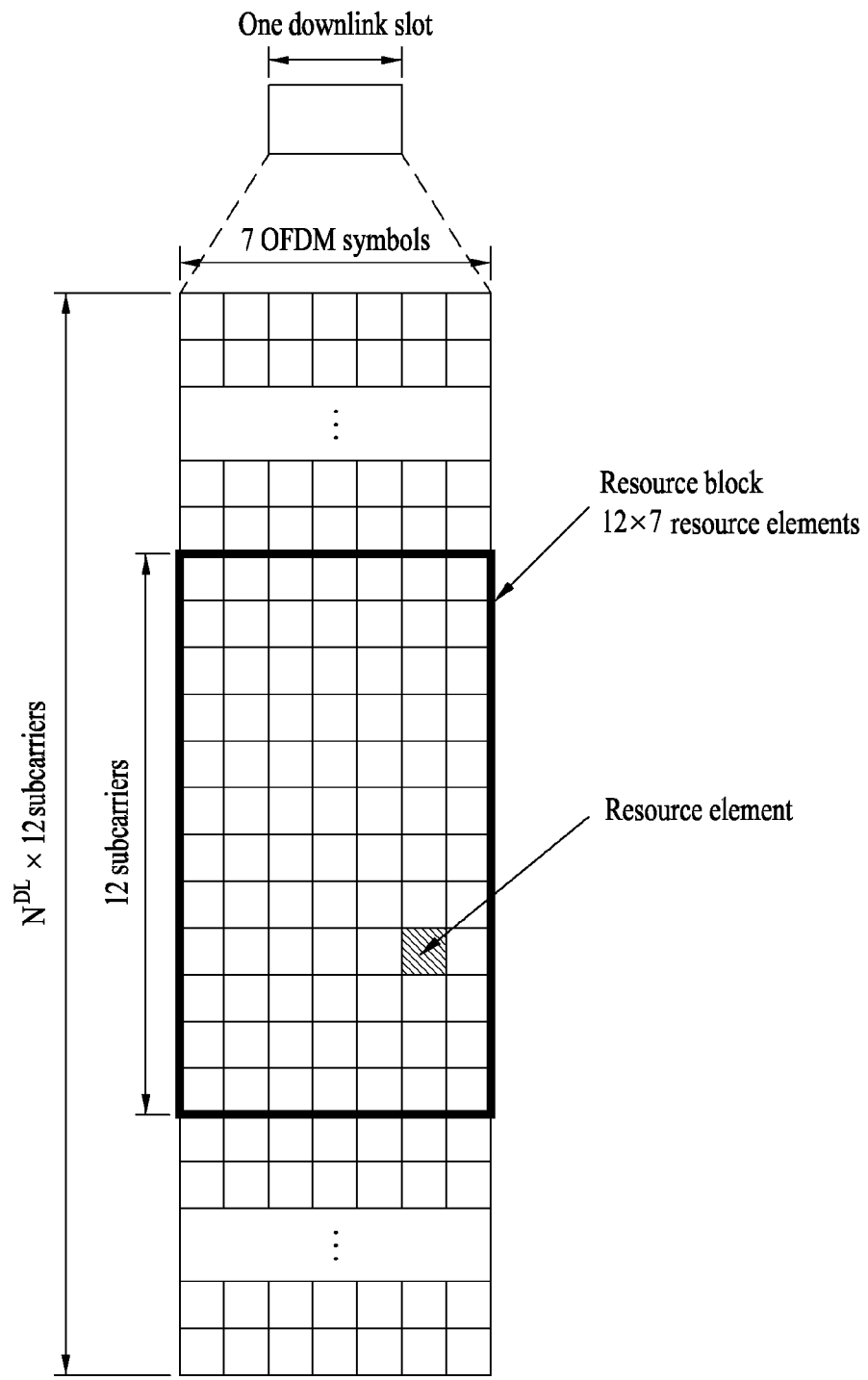
FIG. 3 is a diagram for one example of a resource grid for a downlink slot.

FIG. 3 is a diagram for one example of a resource grid for a downlink (DL) slot.

Referring to FIG. 3, one downlink (DL) slot may include a plurality of OFDM symbols in time domain. In particular, one DL slot exemplarily includes 7 OFDM symbols and one resource block (RB) exemplarily includes 12 subcarriers in frequency domain, by which the present invention may be non-limited.

Each element on a resource grid is called a resource element (hereinafter abbreviated RE). One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 4:
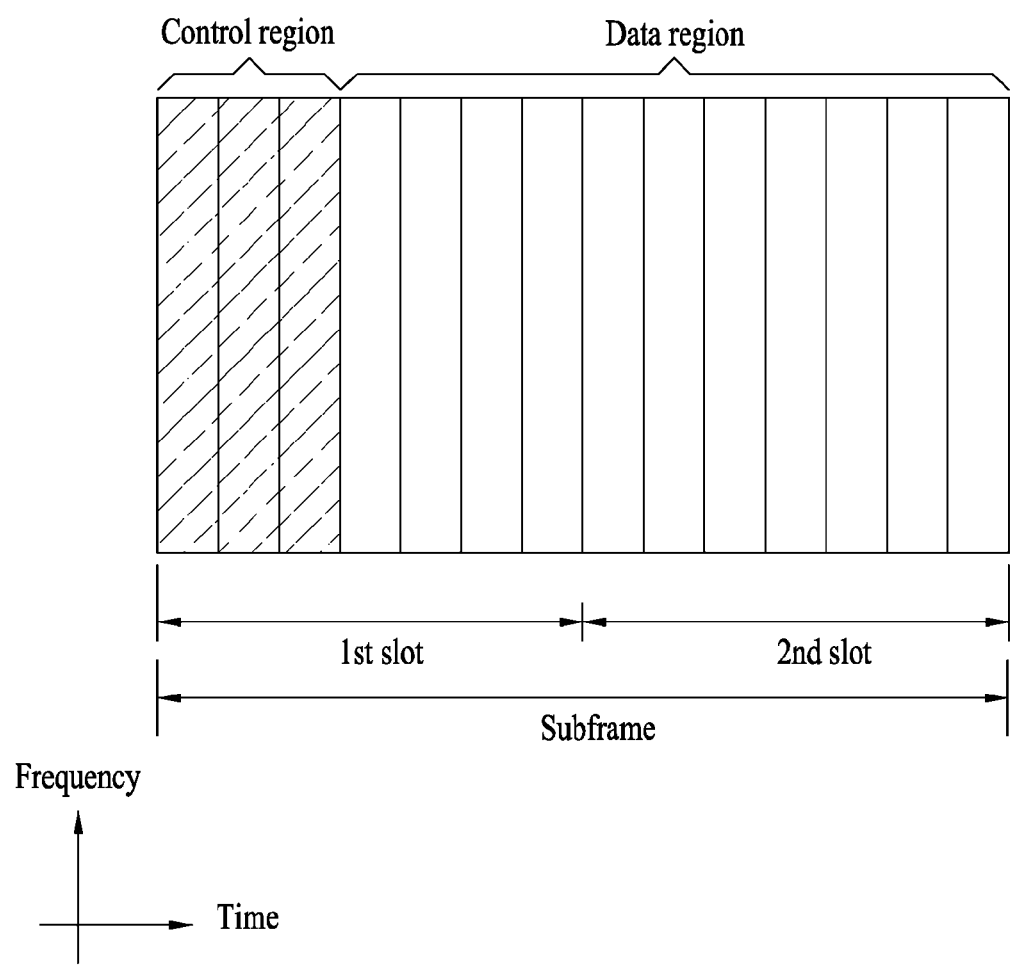
FIG. 4 is a diagram for a structure of a downlink subframe.

FIG. 4 shows a structure of a downlink (DL) subframe.

Referring to FIG. 4, maximum 3 OFDM symbols situated in a head part of a first slot of one subframe correspond to a control region to which control channels are allocated. The rest of OFDM symbols correspond to a data region to which PDSCH (physical downlink shared channel) is allocated. Examples of DL control channels used by 3GPP LTE may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and carries information on the number of OFDM symbols used for a transmission of a control channel within the subframe. The PHICH is a response channel in response to UL and carries ACK/NACK (acknowledgement/non-acknowledgement) signal for HARQ (hybrid automatic repeat request). Control information carried on PDCCH may be called downlink control information (hereinafter abbreviated DCI). The DCI may include UL resource allocation information, DL resource allocation information or a UL transmission (Tx) power control command for a random UE (user equipment) group.

Figure 5:
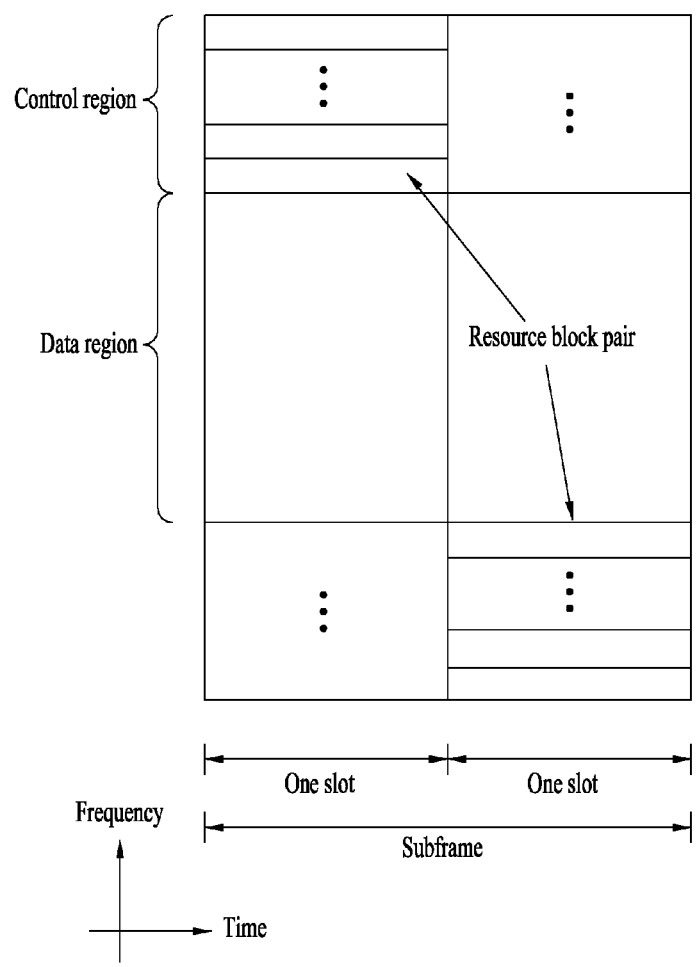
FIG. 5 is a diagram for a structure of an uplink subframe.

FIG. 5 shows a structure of an uplink (UL) subframe.

Referring to FIG. 5, a UL subframe may be divided into a control region and a data region in frequency domain. A physical UL control channel (PUCCH), which carries UL control information, is allocated to the control region. And, a physical UL shared channel (PUSCH), which carries user data, is allocated to the data region. In order to maintain single carrier property, one user equipment does not transmit PUCCH and PUSCH simultaneously. A resource block pair (RB pair) in subframe is allocated to PUCCH for one user equipment. Resource blocks belonging to the resource block (RB) pair may occupy different subcarriers in each of 2 slots. Namely, a resource block pair allocated to PUCCH is frequency-hopped on a slot boundary.

2. The General of D2D (Device-to-Device) Communication

In a short range communication, a communication between user equipments (i.e., D2D communication) may be generally defined as a peer-to-peer form. These communication subjects reciprocally perform a communication by defining a random access protocol in-between and do not need to consider whether one of the communication subjects is actually connected to a public internet network.

On the contrary, a communication in a cellular network should be defined as a communication between a base station and a user equipment or a communication between an entity equivalent to a base station and a user equipment. And, the whole communication behaviors are controlled by the base station or the entity equivalent to the base station. Under this protocol, the cellular network restricts behaviors of all user equipments by a predetermined rule, thereby enabling a structure for obtaining maximum throughput. Yet, this rule may have over-ruled aspects depending on an application or a channel environment of a user equipment. For instance, a base station determines a power to be consumed for a transmission of the same data traffic by a user equipment and all behaviors of the user equipment for the transmission of the same data traffic should work under the control of the base station in a manner that the base station is placed in the middle for a short range communication as well. In order to achieve a short range communication with low power consumption, a user equipment should have a structure of utilizing another radio access technology (RAT) or accept the inconvenience of the cellular network. According to such a structural problem, since a channel environment of a user equipment is vulnerable, when the user equipment accesses a network, some restrictions are put on the user equipment that uses an optimal communication path by searching for a new access path.

Figure 6:
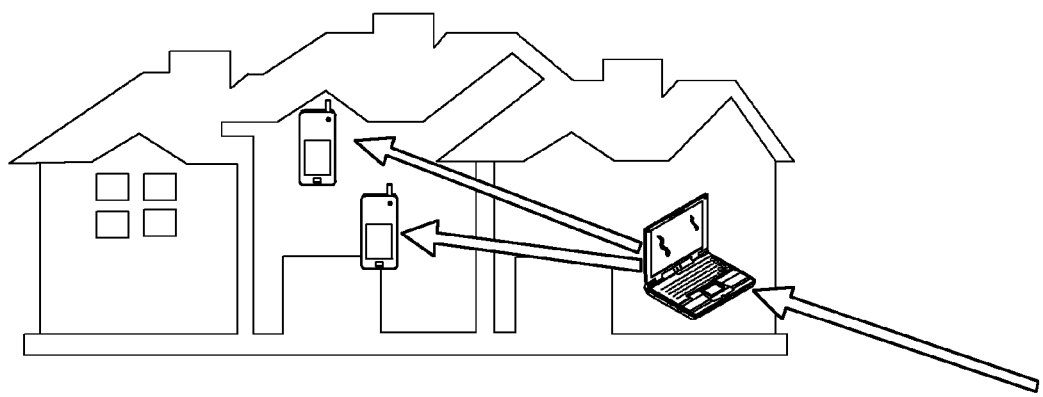
FIG. 6 and FIG. 7 are diagrams for examples of applying a D2D communication.
Figure 6:
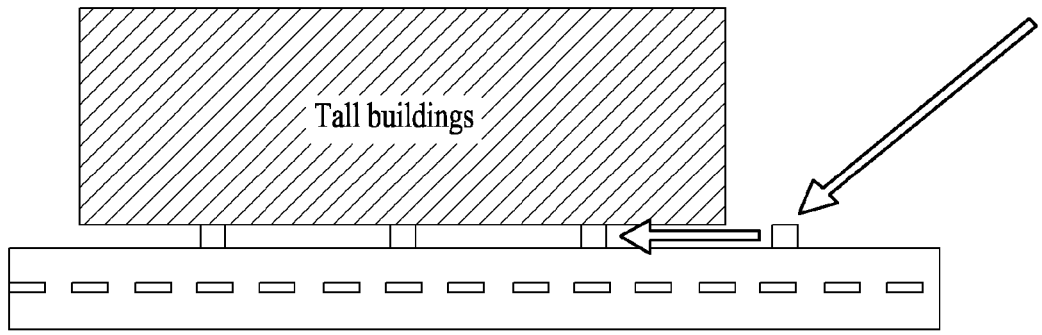
Figure 7:
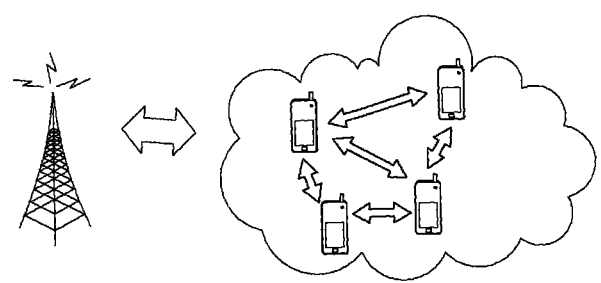
Figure 7:
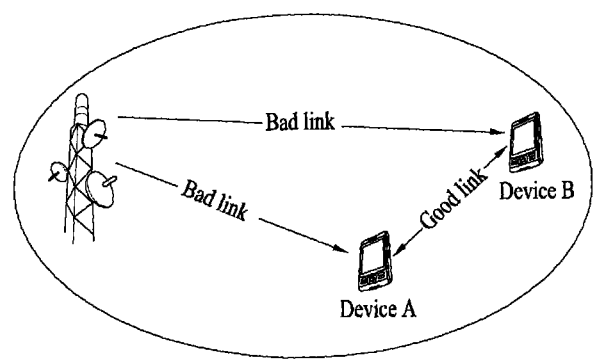

FIG. 6 and FIG. 7 are diagrams for examples of applying a D2D communication.

If a propagation loss between a source user equipment and a base station is considerable or a channel equality is equal to or lower than a predetermined level, a D2D communication can be triggered. For instance, referring to FIG. 6 (a), when a plurality of terminals are located in a room, a channel status may be changed depending on a user equipment location. Hence, the source user equipment can improve data throughput through a D2D communication or raise a data reception quality. Moreover, referring to FIG. 6 (b), as a source user equipment is located on an alley between tall buildings, although the source user equipment is included in a radio shadow area, if the source user equipment has a good channel state with another nearby user equipment, the source user equipment communicates with the nearby user equipment and the user equipment in a good channel state communicates with a base station. Therefore, it is able to enhance power efficiency and throughput of the user equipment that becomes a source of data traffic. Thus, if a plurality of user equipments exist and are managed, when a server accesses each of the user equipments through a base station, it is able to consider a model that a specific user equipment plays a role as an aggregator for a plurality of the user equipments.

For another instance, referring to FIG. 7, if a user equipment intends to communicate with a nearby user equipment by utilizing an RAT of cellular only without using an RAT different from that of the cellular, a corresponding data exchange is controlled by a base station. Yet, even if user equipments are located so close to each other, data transceived between the user equipments should be forwarded to a base station and then retransmitted to the destined user equipment. Thus, such a structure is companied by an unreasonable communication structure. In doing so, if an owner, which manages user equipments performing a direct D2D communication, manages the corresponding user equipments in a manner of being located adjacent to the corresponding user equipments, it is preferable that data is directly delivered to a managed user equipment of the corresponding owner rather than forwarded to a base station.

In doing so, comparing the above-mentioned case to a case of using another RAT (e.g., WiFi, Bluetooth, Zigbee, etc.), since a user equipment does not need to include a model for multiple RATs, it is able to configure an inexpensive eco-system. Since the multiple RATs are not used, it is unnecessary to implement a processing configuration for unnecessary application layers. Moreover, if an air-interface for a D2D communication and an air-interface for a UE-to-BS (user equipment-to-base station) communication are combinably designed on the single-RAT basis, it is able to overcome the inefficiency in case that the air-interfaces are independently designed on the multi-RAT basis. In particular, if a short range communication and a cellular network access are allowed by utilizing a single RAT, it is able to configure an eco-system of very efficient D2D devices. These features are applicable to user devices (i.e., human devices) likewise. In doing so, it is able to perform both a short range communication and a long range communication through a device of less complexity with small power. And, it is possible to perform an active QoS (quality of service) management for efficiently maintaining a power consumption level and a throughput management.

In the following description, a direct D2D communication means a method of performing a direct communication between user equipments without using a base station in a situation that a channel state between at least two user equipments is good or user equipments are located adjacent to each other. In doing so, although data is exchanged between the user equipments through the direct communication, the D2D communication associated with the present invention differs from such a communication for exchanging data between user equipments without involvement of a base station as a Bluetooth communication, an infrared ray communication and the like in that prescribed control information for a D2D communication is provided by a base station.

The aforementioned direct D2D communication can be used together with such a terminology as a device-to-device (D2D) communication, a mobile station-to-mobile station (MS-to-MS, M2M) communication, a peer-to-peer (P2P) communication and the like. For clarity of the following description, 'D2D communication' is generally used to describe embodiments of the present invention. And, 'D2D UE (user equipment)' means a user equipment (UE) that supports a D2D communication.

3. Method of Requesting D2D (Device-to-Device) Communication

In case that a D2D communication is performed by sharing resource with an existing cellular network, after a user equipment (hereinafter named 'source user equipment (source UE)') desiring the D2D communication has discovered a user equipment (hereinafter named 'target/destination user equipment (target/destination UE)') that becomes a target of the D2D communication, the source user equipment has to confirm whether the target user equipment accepts the D2D communication through a D2D request. In particular, a procedure for the D2D request means a procedure for the source user equipment to query whether the target user equipment accepts the D2D communication before receiving allocation of resource for performing the D2D communication with the target user equipment after the discovery of the target user equipment for performing the D2D communication together. In doing so, since a link is not established between the source user equipment and the target user equipment, it is necessary to define a channel for making a D2D communication request to the target user equipment. Moreover, since a request for the D2D communication is not defined in this process, it is necessary to define a process, information to be transmitted, a transmitting scheme and the like as well as the channel. In the following description, the present invention proposes a D2D request process, a channel and transmission information for requesting a D2D communication after a peer discovery in the D2D communication for directly transceiving data between user equipments. In case of a controlled/centralized D2D communication for a base station to manage resource allocation and the like, a D2D request can be made through the base station after a peer discovery. For clarity of the following description, assume that a source user equipment retains information (e.g., a resource location from which a target user equipment transmits a reference signal or tone, etc.) for identifying a target user equipment. Assume that a base station retains resource information used by each user equipment in a peer discovery. And, assume that a source user equipment can accurately recognize a target user equipment using information retained by the source user equipment. Thus, each of the user equipments for performing the D2D communication in an environment for satisfying the two assumptions can make a D2D request after a peer discovery in a following manner.

Figure 8:
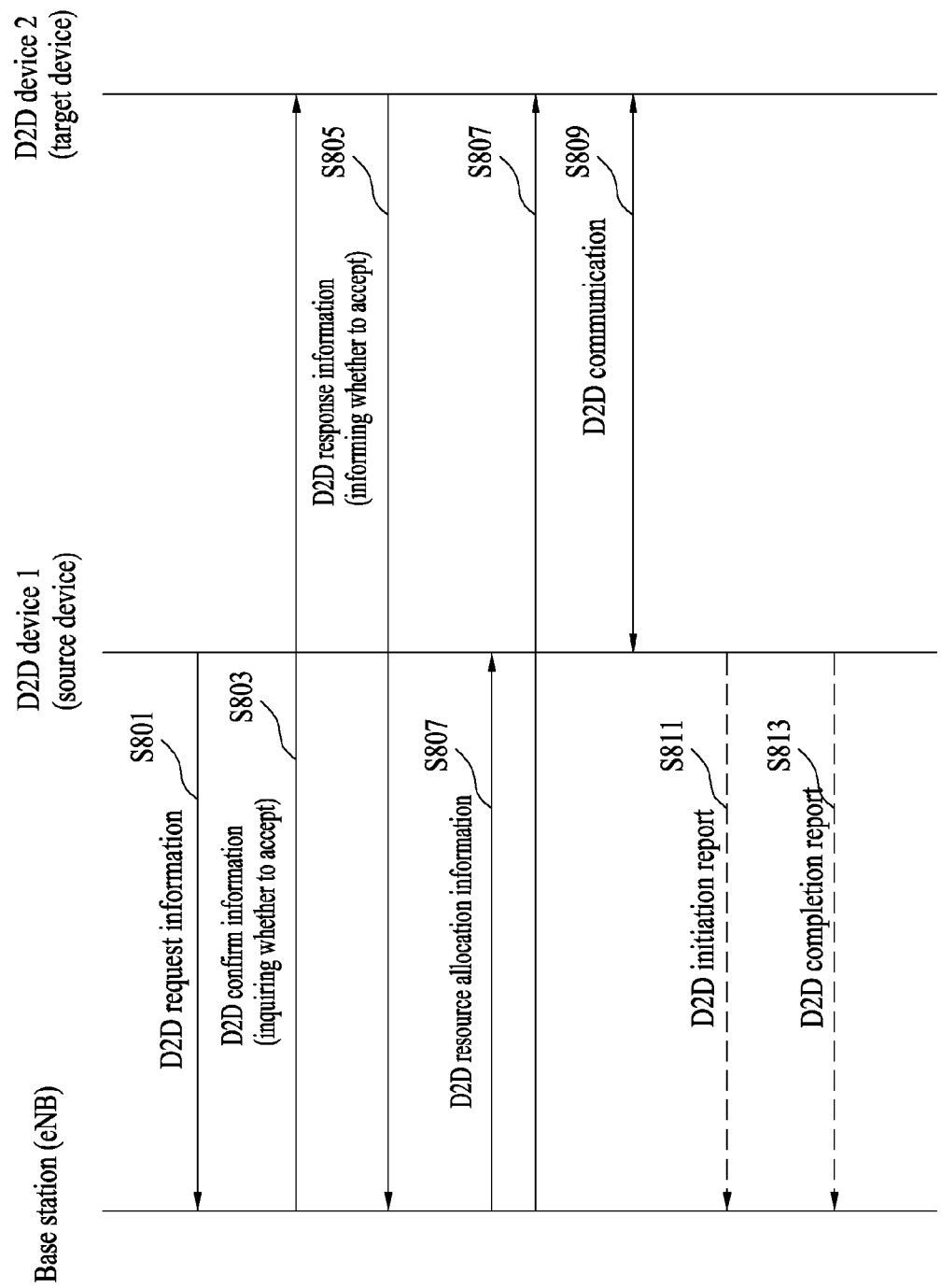
FIG. 8 is a diagram for one example of a method of requesting a D2D communication according to one embodiment of the present invention.

FIG. 8 is a diagram for one example of a method of requesting a D2D communication according to one embodiment of the present invention.

Referring to FIG. 8, a source user equipment intending to perform a D2D communication transmits D2D request information to a base station (eNB) [S801]. In this case, the D2D request information can include identification information of the source user equipment and/or identification information of a target user equipment for performing the D2D communication. And, the D2D request information may include information on neighbor user equipments adjacent to the source user equipment in order to prevent interference between the user equipments adjacent to each other due to the D2D communication.

The D2D request information of the source user equipment can be transmitted to the base station through a different message depending on whether the source user equipment is in an active state or whether the source user equipment receives allocation of a UL resource for transmitting a D2D request. For instance, in case that the source user equipment is in an inactive state, the source user equipment is able to transmit the D2D request information to be base station in the course of performing a random access process with the base station. If the source user equipment receives the allocation of the UL resource through the random access process or the source user equipment is in the active state, the source user equipment can transmit the D2D request information to the base station in the course of transmitting a scheduling request to the base station. In particular, the D2D request information can be transmitted in a manner of being included in a message for the scheduling request.

Having received the D2D request information from the source user equipment, the base station identifies the target user equipment through the D2D request information and then transmits D2D confirm information to the target user equipment to confirm whether the D2d communication with the source UYE is accepted [S803]. In this case, the D2D confirm information can include identification information of the source user equipment and/or information for carrying D2D response information indicating whether the D2D communication is accepted. For instance, the information for carrying the D2D response information may include information on a predetermined indicator (e.g., a sequence, 1 bit, etc.) indicating an acceptance or declination of the D2D communication through the corresponding indicator. If the acceptance or declination of the D2D communication can be discriminated through a location of a resource that carries the D2D information, the information for carrying the D2D response information can include the information on the corresponding resource.

Having received the D2D request information from the base station, the target user equipment transmits D2D response information, which informs the base station of the acceptance or declination of the D2D communication, to the base station [S805]. In this case, D2D response information includes the information on the acceptance or declination of the D2D communication. In doing so, if the target user equipment does not accept the D2D communication, the base station transmits information, which indicates a failure in establishing a link for the D2D communication, to the source user equipment. Having received this information, the source user equipment selects another user equipment and then repeats the D2D request procedure (i.e., the procedure including the steps S801 to S805), or may not continue the D2D communication procedure any further. For clarity of the following description, assume the case that the target user equipment accepts the D2D communication with the source user equipment.

Having received the D2D response information indicating the acceptance of the D2D communication from the target user equipment, the base station transmits resource allocation information for the D2D communication to the source user equipment and the target user equipment [S807]. In particular, the base station may transmit the resource allocation information to both of the source user equipment and the target user equipment simultaneously or may transmit the resource allocation information to the target user equipment only. Thus, if the base station transmits the resource allocation information to the target user equipment only, the base station may be able to transmit the resource allocation information together in the course of transmitting the D2D confirm information for asking the target user equipment whether to accept the D2D communication in the step S805.

Having received the allocation of the resource for the D2D communication from the base station, the source user equipment and the target user equipment perform the D2D communication [S809]. And, the source user equipment can report information, which indicates that the D2D communication has been initiated, to the base station at the timing point of performing the D2D communication [S811]. In the example shown in FIG. 8, the source user equipment submits the D2D initiation report to the base station. Yet, the D2D communication initiation report can be submitted by the target user equipment as well. Moreover, each of the source user equipment and the target user equipment can submit the corresponding report. Optionally, the step of reporting the initiation of the D2D communication to the base station, i.e., the step S811 can be skipped.

Thereafter, at the timing point of terminating the D2D communication between the source user equipment and the target user equipment, the source user equipment can report information, which indicates that the D2D communication has been completed, to the base station [S813]. Like the former step, in the example shown in FIG. 8, the source user equipment submits the D2D completion report to the base station. Yet, the D2D communication completion report can be submitted by the target user equipment as well. Moreover, each of the source user equipment and the target user equipment can submit the corresponding report. Optionally, the step of reporting the completion (or termination) of the D2D communication to the base station, i.e., the step S813 can be skipped.

In the following description, a D2D request procedure for requesting a D2D communication through a base station, a channel for the D2D request procedure, and transmission information for the D2D request procedure are explained in detail.

3. 1. D2D Request & Response Information 3. 1. 1. D2D Request Information

As mentioned in the foregoing description, a D2D request can be performed through a base station. In particular, if a source user equipment makes a D2D request to a base station, the base station transmits a message for querying whether to perform a D2D to a target user equipment and is then able to transmit a result of a response to the query message to a source user equipment. And, D2D request information transmitted to the base station by the source user equipment means indication information for notifying a D2D communication request made by the source user equipment to the base station.

Moreover, identification information (e.g., an identifier of the source user equipment, C-RNTI (cell radio network temporary identifier, etc.) of the source user equipment and identification information of the target user equipment can be included in the D2D request information. In this case, the identification information of the source user equipment and the identification information of the target user equipment may include different configurations or information. For instance, although the identification of the source user equipment includes a C-RNTI (cell radio network temporary identifier) assigned by the base station, the identification information of the target user equipment may include one of a location of a resource carrying a signal for a peer discovery procedure, sequence information of the signal, and the like.

The request information transmitted to the base station by the source user equipment may include information on neighbor user equipments of the source user equipment. In this case, the information on the neighbor user equipments may include a list of user equipments existing within a specific hop from the source user equipment or user equipments recognized by the source user equipment as existing within a specific hop from the source user equipment. For instance, the information on the neighbor user equipments may include a list of user equipments existing within 1-hop of the source user equipment or user equipments recognized as existing within 1-hop by the source user equipment. Moreover, the information on the neighbor user equipments of the source user equipment may include information on user equipments estimated to cause interference over a predetermined level to the source user equipment or user equipments corresponding to neighbor user equipments, each of which has a signal strength (smaller or greater than a predetermined level) of a signal received by the source user equipment by a peer discovery procedure. For instance, the information on the neighbor user equipments of the source user equipment may include a list of user equipments estimated as causing interference to the source user equipment (e.g., a case that a reference signal for a peer discovery or a tone signal is received with a power over a predetermined value) among user equipments existing within 1-hop of the source user equipment or user equipments recognized as existing within 1-hop by the source user equipment. In this case, the information on the neighbor user equipments can have a bitmap configuration (e.g., a peer discovery reference signal map, a tone map, etc.) in which 1 bit is assigned per user equipment. For instance, a neighbor user equipment, which has transmitted a reference signal or a tone signal to be received with a power equal to or greater than a specific threshold (or a power exceeding the specific threshold), can be represented as '1'. On the other hand, a neighbor user equipment, which has transmitted a reference signal or a tone signal to be received with a power smaller than the specific threshold (or a power not exceeding the specific threshold), can be represented as '0'.

3. 1. 2. D2D Response Information

Having received D2D confirm information for querying an acceptance or declination of a D2D communication from a base station, a target user equipment transmits D2D response information, which indicates the acceptance or declination of the D2D communication, to the base station.

The D2D response information can include information for the D2D communication as well as the information on the acceptance or declination of the D2D communication. In particular, the information for the D2D communication may correspond to information on neighbor user equipments of the target user equipment. In this case, the information on the neighbor user equipments may include a list of user equipments existing within a specific hop from the target user equipment or user equipments recognized by the target user equipment as existing within a specific hop from the target user equipment. For instance, the information on the neighbor user equipments may include a list of user equipments existing within 1-hop of the target user equipment or user equipments recognized as existing within 1-hop by the target user equipment. Moreover, the information on the neighbor user equipments of the target user equipment may include information on user equipments estimated to cause interference over a predetermined level to the target user equipment or user equipments corresponding to neighbor user equipments, each of which has a signal strength (smaller or greater than a predetermined level) of a signal received by the target user equipment by a peer discovery procedure. For instance, the information on the neighbor user equipments of the target user equipment may include a list of user equipments estimated as causing interference to the target user equipment (e.g., a case that a reference signal for a peer discovery or a tone signal is received with a power over a predetermined value) among user equipments existing within 1-hop of the target user equipment or user equipments recognized as existing within 1-hop by the target user equipment. In this case, the information on the neighbor user equipments can have a bitmap configuration (e.g., a peer discovery reference signal map, a tone map, etc.) in which 1 bit is assigned per user equipment. For instance, a neighbor user equipment, which has transmitted a reference signal or a tone signal to be received with a power equal to or greater than a specific threshold (or a power exceeding the specific threshold), can be represented as '1'. On the other hand, a neighbor user equipment, which has transmitted a reference signal or a tone signal to be received with a power smaller than the specific threshold (or a power not exceeding the specific threshold), can be represented as '0'.

3. 2. D2D Request Procedure 3. 2. 1. D2D Request in Random Access Procedure

In order for a source user equipment to transmit a D2D request to a base station, a transmission channel is required. When the source user equipment makes the D2D request to the base station, if the source user equipment is not in active state (e.g., RRC_IDLE state, state failing in UL synchronization despite RRC_CONNECTED state, etc.), it may happen that the source user equipment should perform a random access process for being synchronized with the base station and the like in order to transmit the D2D request to the base station. In doing so, the source user equipment transmits D2D request information to the base station in the course of the random access process and is then able to receive D2D response information indicating an acceptance or declination of a D2D communication from a counterpart or target user equipment through the base station.

As mentioned in the foregoing description with reference to FIG. 1, the contention-based random access procedure can proceed in a manner of the following steps. In the $1^{st}$ step, a user equipment can transmit a random access preamble to enable a base station to estimate a transmission timing of the user equipment. Subsequently, in the $2^{nd}$ step, the base station transmits a random access response (RAR). In this case, the random access response can be indicated by RA-RNTI (radon access radio network temporary identifier). In particular, the random access response can include a confirmation of a preamble detected by a base station, a timing alignment indication for synchronizing a UL transmission of the user equipment based on a timing estimation using a preamble, an initial UL resource allocation for a message transmission in a $3^{rd}$ step, and assignment information of a temporary C-RNTI (Temporary Cell Radio Network Temporary Identifier). Subsequently, in the $3^{rd}$ step, the user equipment sends an L2/L3 message through the UL resource allocated in the $2^{nd}$ step. In this case, the L2/L3 message includes the temporary C-RNTI assigned in the $2^{nd}$ step and is able to include a C-RNTI (if assigned already) or a 48-bit unique user equipment identifier. Finally, in a $4^{th}$ step, the base station can send a contention resolution message including the 48-bit user equipment identifier or C-RNTI (or temporary C-RNTI) included in the L2/L3 message in the $3^{rd}$ step to the user equipment.

1) The source user equipment can transmit D2D request information carried on a message 3 (i.e., the message in the $3^{rd}$ step) of the random access procedure. In particular, the former step S801 shown in FIG. 8 can be performed while the source user equipment is performing the random access procedure with the base station. In this case, the D2D request information may correspond to the former D2D request information defined in '3. 1.' or a portion thereof.

To the message 3 of the random access procedure, information for a D2D request can be added as well as an existing L2/L3 message. In this case, the information for the D2D request and the L2/L3 message may be jointly coded with each other. Alternatively, the information for the D2D request and the L2/L3 message may be coded separately from each other. Alternatively, the existing L2/L3 message is not carried on the message 3 but the information for the D2D request can be carried on the message 3.

Thus, in case that the D2D request information is transmitted through the message 3, an indicator bit or indicator bits for informing the base station of the random access procedure for the D2D request instead of an existing random access procedure for a cellular network can be transmitted in a manner of being contained in the initial transmission (message 1) or the $2^{nd}$ transmission (message 3) in the random access procedure. For instance, if it is 0 using 1-bit indicator, it can indicate the random access procedure for the cellular network. For another instance, if it is 1 using 1-bit indicator, it can indicate the random access procedure for the D2D request. In this case, a plurality of the indicator bits can be generated in a manner of performing a repetition coding or channel coding on 1-bit indication information. Moreover, the indicator bit or the indicator bits can be transmitted at a predetermined location. For instance, the indicator bit(s)

can be located at a most significant bit (MSB) or a list significant bit (LSB) of whole information.

2) Having received the message 3 from the source user equipment, the base station can check an acceptance or declination of a D2D communication from a target acceptance or declination of a D2D communication before sending a message 4 (the message in the $4^{th}$ step, contention resolution) to the source user equipment. In particular, the former step S803 shown in FIG. 8 can be performed while the source user equipment is performing the random access procedure with the base station.

Generally, in a random access procedure, after a user equipment has sent the message 3 to the base station, if there is no response from the base station, the user equipment stands by for a predetermined time and then re-sends the message 3 to the base station. Yet, as mentioned in the foregoing description, in case of performing a D2D request process through a random access procedure, since the base station checks the acceptance or declination of the D2D communication from the target user equipment before sending the message 4 to the source user equipment, if there is no response from the base station after the source user equipment has sent the message 3, a standby time necessary for the source user equipment to re-send the message 3 to the base station may be set greater than that of an existing random access procedure. For instance, when a D2D request is made through a random access procedure, after the source user equipment has waited 8 ms longer than that of an existing random access in a cellular network, if there is no response to the message 3 from the base station, the source user equipment can re-send the message 3.

Moreover, after the base station has sent the message for checking an acceptance or declination of a D2D communication to the target user equipment, if the base station does not receive a response to the acceptance or declination of the D2D communication from the target user equipment within a predetermined time, the base station can transmit ACK (acknowledgement), which indicates that the message 3 has been normally received, to the source user equipment. In particular, as mentioned in the foregoing description, if there is no response to the message 3 for a predetermined standby time, since the source user equipment retransmits the message 3, the base station can transmit the ACK for the message 3 to prevent the retransmission of the message 3. In doing so, the time for the base station to wait for the response from the target user equipment may include 3 ms or 4 ms. If the base station transmits not the resource allocation information but the ACK, the source user equipment can confirm that the response of the acceptance or declination of the D2D communication is not transmitted by the target user equipment. And, the source user equipment can stand by without retransmitting the message 3. Moreover, the source user equipment selects another target user equipment and is then able to repeat the D2D request procedure.

3) The base station can transmit information on a resource used for the D2D communication through a message 4 (contention resolution). In particular, the step S807 shown in FIG. 8 can be performed while the target user equipment is performing the random access procedure with the base station. In doing so, the base station can send the message 4 to both of the source user equipment and the target user equipment simultaneously. Alternatively, the base station sends the message 4 to the source user equipment only. In case of the target user equipment, the base station can transmit the resource allocation information together while transmitting the D2D confirm information for confirming the acceptance or declination of the D2D communication.

4) Having received the message 4 from the base station, the source user equipment and the target user equipment can proceed to the D2D communication using a resource designated by the message 4. In particular, the step S809 shown in FIG. 8 can be performed.

3. 2. 2. D2D Request after Random Access Procedure

Having completed a random access procedure, a source user equipment can transmit D2D request information through a UL resource allocated by a base station.

A user equipment is able to inform a base station of a scheduling request for a D2D request by transmitting an indicator of 1-bit or a plurality of bits together with the scheduling request. For instance, if it is 0 using 1-bit indicator, it can indicate a scheduling request for a cellular network. For another instance, if it is 1 using 1-bit indicator, it can indicate a scheduling request for a D2D communication. In this case, a plurality of the indicator bits can be generated in a manner of performing a repetition coding or channel coding on 1-bit indication information. Moreover, the indicator bit(s) can be transmitted at a predetermined location. For instance, the indicator bit(s) can be located at a most significant bit (MSB) or a list significant bit (LSB) of whole information.

Moreover, the user equipment can inform the base station of a scheduling request for a D2D request by cyclically shifting a preamble sequence used for the scheduling request or changing an initial value for a sequence generation.

Thus, when the D2D request is made by transmitting the scheduling request to the base station, information on target user equipment(s) can be transmitted together with the scheduling request. In particular, as mentioned in the foregoing description, identification information of the target user equipment can be included in the D2D request information. In this case, the identification information of the target user equipment can include one of a location of a resource carrying a signal for a peer discovery procedure, sequence information of the signal and the like.

Moreover, the source user equipment is able to transmit information on neighbor user equipments of the source user equipment together with the scheduling request. In this case, the information on the neighbor user equipments may include a list of user equipments existing within a specific hop from the target user equipment or user equipments recognized by the target user equipment as existing within a specific hop from the target user equipment. For instance, the information on the neighbor user equipments may include a list of user equipments existing within 1-hop of the target user equipment or user equipments recognized as existing within 1-hop by the target user equipment. Moreover, the information on the neighbor user equipments of the target user equipment may include information on user equipments estimated to cause interference over a predetermined level to the target user equipment or user equipments corresponding to neighbor user equipments, each of which has a signal strength (smaller or greater than a predetermined level) of a signal received by the target user equipment by a peer discovery procedure. For instance, the information on the neighbor user equipments of the target user equipment may include a list of user equipments estimated as causing interference to the target user equipment (e.g., a case that a reference signal for a peer discovery or a tone signal is received with a power over a predetermined value) among user equipments existing within 1-hop of the target user equipment or user equipments recognized as existing within 1-hop by the target user equipment. In this case, the information on the neighbor user equipments can have a bitmap configuration (e.g., a peer discovery reference signal map, a tone map, etc.) in which 1 bit is assigned per user equipment. For instance, a neighbor user equipment, which has transmitted a reference signal or a tone signal to be received with a power equal to or greater than a specific threshold (or a power exceeding the specific threshold), can be represented as '1'. On the other hand, a neighbor user equipment, which has transmitted a reference signal or a tone signal to be received with a power smaller than the specific threshold (or a power not exceeding the specific threshold), can be represented as '0'.

3. 2. 3. D2D Request in Active Mode

When a source user equipment in active mode transmits a D2D request through a base station, it is able to operate in a following manner.

A user equipment is able to inform a base station of a scheduling request for a D2D request by transmitting an indicator of 1-bit or a plurality of bits together with the scheduling request. For instance, if it is 0 using 1-bit indicator, it can indicate a scheduling request for a cellular network. For another instance, if it is 1 using 1-bit indicator, it can indicate a scheduling request for a D2D communication. In this case, a plurality of the indicator bits can be generated in a manner of performing a repetition coding or channel coding on 1-bit indication information. Moreover, the indicator bit(s) can be transmitted at a predetermined location. For instance, the indicator bit(s) can be located at a most significant bit (MSB) or a list significant bit (LSB) of whole information.

Moreover, the user equipment can inform the base station of a scheduling request for a D2D request by cyclically shifting a preamble sequence used for the scheduling request or changing an initial value for a sequence generation.

Thus, when the D2D request is made by transmitting the scheduling request to the base station, information on target user equipment(s) can be transmitted together with the scheduling request. In particular, as mentioned in the foregoing description, identification information of the target user equipment can be included in the D2D request information. In this case, the identification information of the target user equipment can include one of a location of a resource carrying a signal for a peer discovery procedure, sequence information of the signal and the like.

Moreover, the source user equipment is able to transmit information on neighbor user equipments of the source user equipment together with the scheduling request. In this case, the information on the neighbor user equipments may include a list of user equipments existing within a specific hop from the target user equipment or user equipments recognized by the target user equipment as existing within a specific hop from the target user equipment. For instance, the information on the neighbor user equipments may include a list of user equipments existing within 1-hop of the target user equipment or user equipments recognized as existing within 1-hop by the target user equipment. Moreover, the information on the neighbor user equipments of the target user equipment may include information on user equipments estimated to cause interference over a predetermined level to the target user equipment or user equipments corresponding to neighbor user equipments, each of which has a signal strength (smaller or greater than a predetermined level) of a signal received by the target user equipment by a peer discovery procedure. For instance, the information on the neighbor user equipments of the target user equipment may include a list of user equipments estimated as causing interference to the target user equipment (e.g., a case that a reference signal for a peer discovery or a tone signal is received with a power over a predetermined value) among user equipments existing within 1-hop of the target user equipment or user equipments recognized as existing within 1-hop by the target user equipment. In this case, the information on the neighbor user equipments can have a bitmap configuration (e.g., a peer discovery reference signal map, a tone map, etc.) in which 1 bit is assigned per user equipment. For instance, a neighbor user equipment, which has transmitted a reference signal or a tone signal to be received with a power equal to or greater than a specific threshold (or a power exceeding the specific threshold), can be represented as '1'. On the other hand, a neighbor user equipment, which has transmitted a reference signal or a tone signal to be received with a power smaller than the specific threshold (or a power not exceeding the specific threshold), can be represented as '0'.

Thus, the scheduling request transmitted for the D2D request can be transmitted on PUCCH or PRACH.

3. 3. Procedure for Confirming Acceptance or Declination of D2D Communication

When a target user equipment transmits a response to D2D confirm information (i.e., querying an acceptance or declination of a D2D communication) received from a base station, if the target user equipment is in active mode, the target user equipment can transmit the response for the acceptance or declination to the base station through a resource allocated by the base station. Yet, when the target user equipment transmits the response for the D2D confirm information (i.e., querying an acceptance or declination of the D2D communication) received from the base station, if the target user equipment is not in active state (e.g., RRC_IDLE state, state failing in matching UL synchronization despite RRC_CONNECTED state, etc.), it may happen that the target user equipment should perform a random access procedure for matching synchronization with the base station and the like in order to transmit the response to the D2D request. In particular, the step S805 shown in FIG. 8 can be performed while the target user equipment is performing the random access procedure with the base station.

Thus, if the transmission of the D2D response information of the target user equipment is performed in the random access procedure, after the base station has transmitted the D2D confirm information (e.g., querying an acceptance or declination of a D2D communication) to the target user equipment, a reply (e.g., a transmission of acceptance or declination, information for the D2D communication, and/or the like) from the target user equipment to the base station can be performed through a contention free/dedicated random access procedure. In doing so, when the base station transmits the D2D confirm information (e.g., querying an acceptance or declination of a D2D communication) to the target user equipment, information (e.g., information of a random access preamble sequence, etc.) for a dedicated random access can be transmitted together with the D2D confirm information. For instance, the base station assigns two preambles to the target user equipment and enables the preambles to indicate an acceptance and a declination of the D2D communication, respectively. In particular, each of the preambles means the D2D response information.

While the target user equipment performs the dedicated random access procedure on the base station, the target user equipment can transmit information for a D2D communication together with a transmission of a random access preamble indicating a response for an acceptance or declination. In particular, the D2D response information can include the information for the D2D communication (e.g., information on neighbor user equipments of the target user equipment) as well as the acceptance or declination of the D2D communication. Moreover, after the target user equipment has transmitted the random access preamble, it is able to transmit the information for the D2D communication as well. In particular, after the target user equipment has received the random access response (PAR) to the random access preamble transmitted by the base station, the target user equipment can transmit the information (e.g., the information on the neighbor user equipments of the target user equipment) for the D2D communication to the base station.

The information on the neighbor user equipments may include a list of user equipments existing within a specific hop from the target user equipment or user equipments recognized by the target user equipment as existing within a specific hop from the target user equipment. For instance, the information on the neighbor user equipments may include a list of user equipments existing within 1-hop of the target user equipment or user equipments recognized as existing within 1-hop by the target user equipment. Moreover, the information on the neighbor user equipments of the target user equipment may include information on user equipments estimated to cause interference over a predetermined level to the target user equipment or user equipments corresponding to neighbor user equipments, each of which has a signal strength (smaller or greater than a predetermined level) of a signal received by the target user equipment by a peer discovery procedure. For instance, the information on the neighbor user equipments of the target user equipment may include a list of user equipments estimated as causing interference to the target user equipment (e.g., a case that a reference signal for a peer discovery or a tone signal is received with a power over a predetermined value) among user equipments existing within 1-hop of the target user equipment or user equipments recognized as existing within 1-hop by the target user equipment. In this case, the information on the neighbor user equipments can have a bitmap configuration (e.g., a peer discovery reference signal map, a tone map, etc.) in which 1 bit is assigned per user equipment.

3. 4. D2D Communication Reporting

After each of a source user equipment and a target user equipment has received allocation of a resource for a D2D communication from a base station, while the D2D communication is performed, if a D2D link quality is lowered below a predetermined level or a D2D link is disconnected, at least one of the source user equipment and the target user equipment may not communicate with the base station unless moving away into another cell. In particular, after receiving the resource for the D2D link, the source user equipment and/or the target user equipment may not transmit any data to the base station until a problem is caused to the D2D communication.

Thereafter, if the D2D communication is completed, the source user equipment and/or the target user equipment is able to report the information on the performed D2D communication to the base station. In this case, the information reported to the base station may include a total amount of data transmitted, received, or transceived through the D2D communication. And, the information reported to the base station may include information on a time (or timing) at which the D2D communication is initiated. In this case, the D2D communication initiated time may include a timing point at which the source or target user equipment has initially transmitted data through the resource allocated by the base station. Moreover, the information reported to the base station may include time (or timing) information of the time at which the D2D communication is completed. In this case, the D2D communication completed time may include a timing point at which a signal, which indicates the D2D communication is completed, is transceived between the source user equipment and the target user equipment.

Thus, each of the source user equipment and the target user equipment can return the resource allocated for the D2D communication at the D2D communication completed timing point as soon as reports the information on the D2D communication to the base station. In particular, having received the reporting from the source user equipment and/or the target user equipment, the base station can allocate the corresponding resource to another user equipment or communication.

The source user equipment and/or the target user equipment, which performs the D2D communication, is able to report an initiation of the D2D communication to the base station as soon as initiates the D2D communication. In particular, the source user equipment or the target user equipment is able to report the initiation of the D2D communication to the base station in the course of initially transmitting data on the resource allocated by the base station.

3. The General of Device for Implementing the Present Invention

Figure 9:
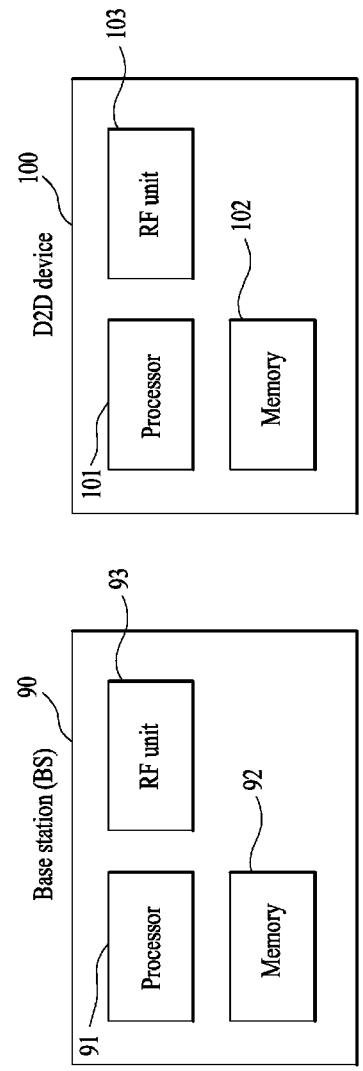
FIG. 9 is a block diagram for a configuration of a wireless communication device according to one embodiment of the present invention.

FIG. 9 is a block diagram for a configuration of a wireless communication device according to one embodiment of the present invention.

Referring to FIG. 9, a wireless communication system may include a base station (BS) 90 and a plurality of D2D user equipments 100 located within an area of the base station 90. In this case, the D2D user equipment may correspond to the aforementioned source or target user equipment.

The base station 90 may include a processor 91, a memory 92 and an RF (radio frequency) unit 93. The processor 91 implements the proposed functions, processes and/or methods. Layers of a radio interface protocol can be implemented by the processor 91. The memory 92 is connected with the processor 91 and then stores various kinds of information to drive the processor 91. The RF unit 93 is connected with the processor 91 and then transmits and/or receives radio signals.

The D2D user equipment 100 includes a processor 101, a memory 102 and an RF unit 103. The processor 101 implements the proposed functions, processes and/or methods. Layers of a radio interface protocol can be implemented by the processor 101. The memory 102 is connected with the processor 101 and then stores various kinds of information to drive the processor 101. The RF unit 103 is connected with the processor 101 and then transmits and/or receives radio signals.

The memory 92/102 may be provided inside or outside the processor 91/101. And, the memory 92/102 may be connected with the processor 91/101 via various kinds of well-known means. Moreover, the base station 90 and/or the D2D user equipment 100 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various well-known means.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a data transceiving method in a wireless access system according to the present invention is described with reference to examples applied to 3GPP LTE system, it may be applicable to various kinds of wireless access systems as well as the 3GPP LTE system.

What is claimed is:

1. A method of requesting a D2D (device-to-device) communication by a base station in a wireless access system supportive of the D2D communication, the method comprising:
receiving from a first device, by the base station, request information for requesting the D2D communication with a second device; and
transmitting to the second device, by the base station, confirmation information for querying whether the second device accepts the D2D communication with the first device;
wherein when the second device is in an active state, the method further comprising:
receiving by the base station from the second device, through a resource allocated by the base station, first response information indicating whether the second device accepts the D2D communication with the first device, and
if the base station receives, from the second device, the first response information indicating an acceptance of the D2D communication with the first device, transmitting, by the base station, first resource allocation information for the D2D communication to each of the first and second device,
wherein when the second device is not in an active state, the method further comprising:
assigning, by the base station to the second device, for a dedicated random access procedure, a first random access preamble for indicating the acceptance of the D2D communication with the first device and a second random access preamble for indicating declination of the D2D communication with the first device,
receiving from the second device, by the base station, second response information comprising the first random access preamble or the second random access preamble through the dedicated random access procedure, and
if the base station receives the second response information comprising the first random access preamble from the second device, transmitting, by the base station, second resource allocation information for the D2D communication to each of the first and second device.

2. The method of claim 1, wherein the request information comprises identification information of at least one neighbor device estimated as causing an interference over a predetermined level among neighbor devices adjacent to the first device.

3. The method of claim 1, wherein the request information is transmitted through a pre-allocated uplink resource in a contention-based random access procedure.

4. The method of claim 3, wherein the resource allocation information is transmitted through a message in the contention-based random access procedure, after receiving the request information.

5. The method of claim 1, wherein the request information is transmitted along with a scheduling request.

6. A base station that requests a D2D (device-to-device) communication in a wireless access system supportive of the D2D communication, the base station comprising:
an RF (radio frequency) unit that transmits and receives radio signals; and
a processor that controls the RF unit to:
receive request information for requesting the D2D communication with a second device, from a first device, and
transmit to the second device, confirmation information for querying whether the second device accepts the D2D communication with the first device,
wherein when the second device is in an active state, the processor further controls the RF unit to receive, from the second device, through a resource allocated by the base station, first response information indicating whether the second device accepts the D2D communication with the first device, and
if the base station receives the first response information indicating an acceptance of the D2D communication with the first device from the second device, the processor further controls the RF unit to transmit first resource allocation information for the D2D communication to each of the first and second device,
wherein when the second device is not in an active state, the processor further:
assigns to the second device, a first random access preamble for indicating the acceptance of the D2D communication with the first device and a second preamble for indicating declination of the D2D communication with the first device;

controls the RF unit to receive from the second device, second response information comprising the first random access preamble or the second random access preamble, and if the base station receives the second response information comprising the first random access preamble from the second device, controls the RF unit to transmit resource allocation information for the D2D to each of the first and second device.

7. The method of claim 1, wherein the first response information further comprises identification information of at least one neighbor device estimated as causing an interference over a predetermined level among neighbor devices adjacent to the second device, and wherein the second response information further comprises the identification information of at least one neighbor device estimated as causing the interference over the predetermined level among the neighbor devices adjacent to the second device.

8. The base station of claim 6, wherein the request information comprises identification information of at least one neighbor device estimated as causing an interference over a predetermined level among neighbor devices adjacent to the first device.

9. The base station of claim 6, wherein the response information comprises identification information of at least one neighbor device estimated as causing an interference over a predetermined level among neighbor devices adjacent to the second device, and wherein the second response information further comprises the identification information of at least one neighbor device estimated as causing the interference over the predetermined level among the neighbor devices adjacent to the second device.

* * * * *